United States Patent
Mathews et al.

(10) Patent No.: US 9,940,149 B2
(45) Date of Patent: Apr. 10, 2018

(54) SYSTEM AND METHOD FOR AUTOMATICALLY LAUNCHING VIRTUAL MACHINES BASED ON ATTENDANCE

(71) Applicant: AMERICAN MEGATRENDS, INC., Norcross, GA (US)

(72) Inventors: Santhosh Samuel Mathews, Chennai (IN); Sudhakar Errappa Parthasarathy, Chennai (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 334 days.

(21) Appl. No.: 14/546,117

(22) Filed: Nov. 18, 2014

(65) Prior Publication Data

US 2016/0139947 A1    May 19, 2016

(51) Int. Cl.
G06F 9/455    (2006.01)
G06F 17/30    (2006.01)
G07C 1/10    (2006.01)

(52) U.S. Cl.
CPC .... *G06F 9/45558* (2013.01); *G06F 17/30876* (2013.01); *G07C 1/10* (2013.01)

(58) Field of Classification Search
None
See application file for complete search history.

(56) References Cited

U.S. PATENT DOCUMENTS

| | | | |
|---|---|---|---|
| 8,683,548 B1* | 3/2014 | Curry | G06F 21/57 |
| | | | 713/152 |
| 9,430,624 B1* | 8/2016 | Mortensen | G06F 21/31 |
| 2008/0184226 A1* | 7/2008 | Ota | H04L 67/22 |
| | | | 718/1 |
| 2010/0325278 A1* | 12/2010 | Heim | G06F 9/4416 |
| | | | 709/226 |
| 2013/0283263 A1* | 10/2013 | Elemary | G06F 9/45558 |
| | | | 718/1 |

(Continued)

FOREIGN PATENT DOCUMENTS

WO    2013091196 A1    6/2013

OTHER PUBLICATIONS

Mohsen Amini Salehi, "Resource provisioning based on preempting virtual machines in distributed systems", 2013 John Wiley & Sons, Ltd.*

*Primary Examiner* — Wynuel Aquino
(74) *Attorney, Agent, or Firm* — Locke Lord LLP; Tim Tingkang Xia, Esq.

(57) ABSTRACT

Certain aspect of the present disclosure relates to a virtual machine (VM) control system, which includes a VM controller. For a plurality of employees, the VM controller registers each employee by assigning an employee ID, and stores registration information in an attendance database. The VM controller also associates one or more VMs to each employee, and stores VM association information between the VMs and the employees in an employee ID database. The VM controller transmits polling inquiries periodically to the attendance database to retrieve employee presence events of the employees. For each employee, the employee presence events include an ingress event and an egress event. When the ingress event is detected and the associated VM is off, the VM controller launches the associated VM. When the egress event is detected and the associated VM is on, the VM controller shuts down the associated VM.

25 Claims, 2 Drawing Sheets

(56) References Cited

U.S. PATENT DOCUMENTS

2015/0339461 A1* 11/2015 Min ................ G06F 21/10
  726/28
2015/0363181 A1* 12/2015 Alberti ............ G06F 9/45504
  717/177

* cited by examiner

SYSTEM AND METHOD FOR AUTOMATICALLY LAUNCHING VIRTUAL MACHINES BASED ON ATTENDANCE

FIELD

The present disclosure relates generally to virtual desktop infrastructure (VDI) technology, and more particularly to systems and methods for automatically launching virtual machines based on attendance.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Remote desktop virtualization implementations operate as client/server computing environments. Application execution takes place on a virtual desktop of a virtual machine which is linked to the local client device over a network or a cloud using a remote display protocol through which the user interacts with applications. All applications and data used remain on the virtual machine with only display, keyboard, and mouse information communicated with the local client device which may be a conventional personal computer, a laptop computer, a thin client device, a tablet, or even a smartphone. A common implementation of this approach is to host multiple desktop operating system instances on one or more virtual machine hardware platform running a hypervisor. This is generally referred to as "Virtual Desktop Infrastructure" or "VDI". However, the convenient access to the virtual desktops of the virtual machine presents potential wasteful consumption of energy and/or computer resources if all virtual machines are running all the times.

Therefore, an unaddressed need exists in the art to address the aforementioned deficiencies and inadequacies.

SUMMARY

In one aspect, the present disclosure related to a virtual machine control system. In certain embodiments, the virtual machine control system has a virtual machine controller which includes a processor and a memory storing computer executable instructions thereon. The computer executable instructions, when executed at the processor, are configured to: (a) register a plurality of employees, wherein each of the plurality of employees is assigned an employee ID; (b) store registration information of each of the plurality of employees in an attendance database; (c) associate one or more of a plurality of virtual machines to each of the plurality of employees, wherein each of the plurality of virtual machines has a virtual machine ID; (d) store virtual machine association information between the plurality of virtual machines and the plurality of employees in an employee ID database; (e) transmit polling inquiries periodically to the attendance database to retrieve employee presence events of the plurality of employees detected by one or more employee presence detection devices in a predetermined polling time interval, wherein for each of the employees, the employee presence events include an ingress event when the employee enters a predetermined area, and an egress event when the employee exits the predetermined area; (f) identify, in response to a detected employee presence event of one of the employees, the virtual machine ID associated with the employee ID of the employee through look-up in the employee ID database; and (g) instruct a hypervisor to launch the virtual machine with the virtual machine ID associated with the employee ID when the detected employee presence event of the one of the employees is the ingress event and when the virtual machine is in an "off" state; and shut down the virtual machine with the virtual machine ID associated with the employee ID when the detected employee presence event of the one of the employees is the egress event and when the virtual machine is in an "on" state.

In certain embodiments, the virtual machine control system further includes: the one or more employee presence detection devices configured to detect employee presence events of the plurality of employees; the attendance database configured to store employee presence events for each of the plurality of employees; the employee ID database configured to store employee IDs and one or more virtual machines associated with each of the plurality of employees; and at least one virtual machine server having the hypervisor and the plurality of virtual machines running on the hypervisor.

In certain embodiments, the one or more employee presence detection devices may include: a security control system of a predetermined area configured to detect the entering and exiting of the plurality of employees individually; a proximity detection device configured to detect the entering and exiting a vicinity of the predetermined area for each of the employees individually; a wireless device detection device configured to detect the presence at and the departure from the predetermined area for each of the employees individually; an online virtual machine control system configured to detect the logins and logouts of the plurality of the employees individually; and an employee working schedule control system configured to control the launching and shutting down a virtual machine according a working schedule of an employee associated with the virtual machine.

In certain embodiments, each of the one or more employee presence detection devices is configured to: determine that the detected employee presence event of the one of the employees is the ingress event when: (a) the employee enters the security control system of the predetermined area, (b) the employee's presence is detected by the proximity detection device of the predetermined area, (c) the employee's presence is detected by the wireless device detection device of the predetermined area, (d) the employee logs into a virtual machine remotely, or (e) a current time reaches the employee's start of predetermined working schedule; determine that the detected employee presence event of the one of the employees is the egress event when: (a) the employee exits the security control system of the predetermined area, (b) the employee's departure is detected by the proximity detection device of the predetermined area, (c) the employee's departure is detected by the wireless device detection device of the predetermined area, (d) the employee logs out of the virtual machine remotely, or (e) the current time reaches the employee's end of predetermined working schedule; and transmit the detected employee presence event of the one of the employees to the attendance database.

In certain embodiments, the attendance database is configured to: (a) receive and store the registration information of each of the employees, (b) receive employee presence events of each of the employees from the one or more employee presence detection devices, (c) update the employee presence events received in the attendance database, (d) maintain the attendance information for each of the employees, (e) receive periodical polling inquiries from the virtual machine controller at the predetermined polling time interval, and (f) transmit, in response to the polling inquiries, the employee presence events occurred during last predetermined polling time interval, along with the employee ID to the virtual machine controller.

In certain embodiments, the employee ID database is configured to: (a) receive and store the registration information of each of the employees with corresponding employee IDs, (b) receive and store the virtual machine ID associated with each of the employees, (c) receive one or more identification inquiries from the virtual machine controller to identify a virtual machine ID based on a given employee ID, and (d) in response to the one or more identification inquiries, transmit the virtual machine ID associated with the employee with the employee ID to the virtual machine controller.

In certain embodiments, the virtual machine controller further includes a network interface controller configured to connect the virtual machine controller to a network. In certain embodiments, the computer executable instructions include firmware, which includes: a polling module configured to transmit the polling inquiries periodically to the attendance database at the predetermined polling time interval to retrieve the employee presence events of the plurality of employees detected by the one or more employee presence detection devices; an employee ID lookup module to identify the virtual machine IDs based on the corresponding employee IDs of the employees whose employee presence events were detected during the last predetermined polling time interval; and a virtual machine control module for launching the virtual machine associated with the employee when the detected employee presence event of the employee is the ingress event and when the corresponding virtual machine is in the "off" state; and shutting down the virtual machine associated with the employee through the lookup when the detected employee presence event of the employee is the egress event and when the corresponding virtual machine is in the "on" state.

In certain embodiments, the firmware further includes a web server module to allow an administrator to perform virtual machine control system functions over the network.

In certain embodiments, a launching delay T1 is applied to delay the launching of the virtual machine when the virtual machine control system instructs the hypervisor to launch the virtual machine, and a shutting down delay T2 is applied to delay the shutting down of the virtual machine when the virtual machine control system instructs the hypervisor to shut down the virtual machine.

In another aspect, the present disclosure relates to a computer-implemented method for a virtual machine control system. The method includes: (a) registering, by a virtual machine controller, a plurality of employees, wherein each of the plurality of employees is assigned an employee ID; (b) storing, by the virtual machine controller, registration information of each of the plurality of employees in an attendance database; (c) associating, by the virtual machine controller, one or more of a plurality of virtual machines to each of the plurality of employees, wherein each of the plurality of virtual machines has a virtual machine ID; (d) storing, by the virtual machine controller, virtual machine association information between the plurality of virtual machines and the plurality of employees in an employee ID database; (e) transmitting, by the virtual machine controller, polling inquiries periodically to the attendance database to retrieve employee presence events of the plurality of employees detected by one or more employee presence detection devices in a predetermined polling time interval, wherein for each of the employees, the employee presence events include an ingress event when the employee enters a predetermined area, and an egress event when the employee exits the predetermined area; (f) in response to a detected employee presence event of one of the employees, identifying, by the virtual machine controller, the virtual machine ID associated with the employee ID of the employee through look-up in the employee ID database; and (g) instructing, by the virtual machine controller, a hypervisor to launch the virtual machine with the virtual machine ID associated with the employee ID when the detected employee presence event of the one of the employees is the ingress event and when the virtual machine is in an "off" state; and shut down the virtual machine with the virtual machine ID associated with the employee ID when the detected employee presence event of the one of the employees is the egress event and when the virtual machine is in an "on" state.

In certain embodiments, the virtual machine control system includes: the virtual machine controller; the one or more employee presence detection devices configured to detect employee presence events of the employees; the attendance database configured to store employee presence events for each of the employees; the employee ID database configured to store employee IDs and one or more virtual machines associated with each of the employees; and at least one virtual machine server having the hypervisor, and the virtual machines are running on the hypervisor.

In certain embodiments, the virtual machine controller includes a processor, a network interface controller configured to connect the virtual machine controller to a network, and a memory storing firmware. The firmware includes a polling module configured to transmit the polling inquiries periodically to the attendance database at the predetermined polling time interval to retrieve the employee presence events of the plurality of employees detected by the one or more employee presence detection devices; an employee ID lookup module to identify the virtual machine IDs based on the corresponding employee IDs of the employees whose employee presence events were detected during the last predetermined polling time interval; and a virtual machine control module for launching the virtual machine associated with the employee when the detected employee presence event of the employee is the ingress event and when the corresponding virtual machine is in the "off" state; and shutting down the virtual machine associated with the employee through the lookup when the detected employee presence event of the employee is the egress event and when the corresponding virtual machine is in the "on" state.

In certain embodiments, the firmware further includes a web server module to allow an administrator to perform virtual machine control system functions over the network.

In certain embodiments, the attendance database is configured to: (a) receive and store the registration information of each of the employees, (b) receive employee presence events of each of the employees from the one or more employee presence detection devices, (c) update the employee presence events received in the attendance database, (d) maintain the attendance information for each of the employees, (e) receive periodical polling inquiries from the virtual machine controller at the predetermined polling time interval, and (f) transmit, in response to the polling inquiries, the employee presence events occurred during last predetermined polling time interval, along with the employee ID to the virtual machine controller.

In certain embodiments, the employee ID database is configured to: (a) receive and store the registration information of each of the employees with corresponding employee IDs, (b) receive and store the virtual machine ID associated with each of the employees, (c) receive one or more identification inquiries from the virtual machine controller to identify a virtual machine ID based on a given employee ID, and (d) in response to the one or more identification inquiries, transmit the virtual machine ID associated with the employee with the employee ID to the virtual machine controller.

In certain embodiments, each of the one or more employee presence detection devices is configured to: determine that the detected employee presence event of the one of the employees is the ingress event when: (a) the employee enters the security control system of the predetermined area, (b) the employee's presence is detected by the proximity detection device of the predetermined area, (c) the employee's presence is detected by the wireless device detection device of the predetermined area, (d) the employee logs into a virtual machine remotely, or (e) a current time reaches the employee's start of predetermined working schedule; determine that the detected employee presence event of the one of the employees is the egress event when: (a) the employee exits the security control system of the predetermined area, (b) the employee's departure is detected by the proximity detection device of the predetermined area, (c) the employee's departure is detected by the wireless device detection device of the predetermined area, (d) the employee logs out of the virtual machine remotely, or (e) the current time reaches the employee's end of predetermined working schedule; and transmit the detected employee presence event of the one of the employees to the attendance database.

In certain embodiments, a launching delay $T1$ is applied to delay the launching of the virtual machine when the virtual machine control system instructs the hypervisor to launch the virtual machine, and a shutting down delay $T2$ is applied to delay the shutting down of the virtual machine when the virtual machine control system instructs the hypervisor to shut down the virtual machine.

In yet another aspect, the present disclosure relates to a non-transitory computer storage medium. In certain embodiments, the non-transitory computer storage medium stores computer-executable instructions. When the computer-executable instructions are executed by a processor of a virtual machine controller, the computer-executable instructions cause the processor to perform following operations: (a) registering all employees, with each of the employees assigned an employee ID, (b) storing registration information of each of the employees in an attendance database, (c) associating one or more of virtual machines to each of the employees, with each of the virtual machines assigned a virtual machine ID, (d) storing virtual machine association information between the virtual machines and the employees in an employee ID database, (e) transmitting polling inquiries periodically to the attendance database to retrieve employee presence events of the plurality of employees detected by one or more employee presence detection devices in a predetermined polling time interval, wherein for each of the employees, the employee presence events include an ingress event when the employee enters a predetermined area, and an egress event when the employee exits the predetermined area, (f) identifying, in response to a detected employee presence event of one of the employees, the virtual machine ID associated with the employee ID of the employee through look-up in the employee ID database, and (g) instructing a hypervisor to launch the virtual machine with the virtual machine ID associated with the employee ID when the detected employee presence event of the one of the employees is the ingress event and when the virtual machine is in an "off" state; and shut down the virtual machine with the virtual machine ID associated with the employee ID when the detected employee presence event of the one of the employees is the egress event and when the virtual machine is in an "on" state.

In certain embodiments, the virtual machine controller includes the processor, a network interface controller configured to connect the virtual machine controller to a network, and a memory storing firmware. The firmware includes: a polling module configured to transmit the polling inquiries periodically to the attendance database at the predetermined polling time interval to retrieve the employee presence events of the plurality of employees detected by the one or more employee presence detection devices; an employee ID lookup module to identify the virtual machine IDs based on the corresponding employee IDs of the employees whose employee presence events were detected during the last predetermined polling time interval; and a virtual machine control module for launching the virtual machine associated with the employee when the detected employee presence event of the employee is the ingress event and when the corresponding virtual machine is in the "off" state; and shutting down the virtual machine associated with the employee through the lookup when the detected employee presence event of the employee is the egress event and when the corresponding virtual machine is in the "on" state.

In certain embodiments, the firmware of the virtual machine controller also includes a web server module to allow an administrator to perform virtual machine control system functions over the network.

In certain embodiments, the attendance database is configured to: (a) receive and store the registration information of each of the employees, (b) receive employee presence events of each of the employees from the one or more employee presence detection devices, (c) update the employee presence events received in the attendance database, (d) maintain the attendance information for each of the employees, (e) receive periodical polling inquiries from the virtual machine controller at the predetermined polling time interval, and (f) transmit, in response to the polling inquiries, the employee presence events occurred during last predetermined polling time interval, along with the employee ID to the virtual machine controller.

In certain embodiments, the employee ID database is configured to: (a) receive and store the registration information of each of the employees with corresponding employee IDs, (b) receive and store the virtual machine ID associated with each of the employees, (c) receive one or more identification inquiries from the virtual machine controller to identify a virtual machine ID based on a given employee ID, and (d) in response to the one or more identification inquiries, transmit the virtual machine ID associated with the employee with the employee ID to the virtual machine controller.

In certain embodiments, each of the one or more employee presence detection devices is configured to: determine that the detected employee presence event of the one of the employees is the ingress event when: (a) the employee enters the security control system of the predetermined area, (b) the employee's presence is detected by the proximity detection device of the predetermined area, (c) the employee's presence is detected by the wireless device detection device of the predetermined area, (d) the employee logs into a virtual machine remotely, or (e) a current time reaches the employee's start of predetermined working schedule; determine that the detected employee presence event of the one of the employees is the egress event when: (a) the employee exits the security control system of the predetermined area, (b) the employee's departure is detected by the proximity detection device of the predetermined area, (c) the employee's departure is detected by the wireless device detection device of the predetermined area, (d) the employee logs out of the virtual machine remotely, or (e) the current time reaches the employee's end of predetermined working schedule; and transmit the detected employee presence event of the one of the employees to the attendance database.

In certain embodiments, a launching delay T1 is applied to delay the launching of the virtual machine when the virtual machine control system instructs the hypervisor to launch the virtual machine, and a shutting down delay T2 is applied to delay the shutting down of the virtual machine when the virtual machine control system instructs the hypervisor to shut down the virtual machine.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings FIGS. 1-2. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
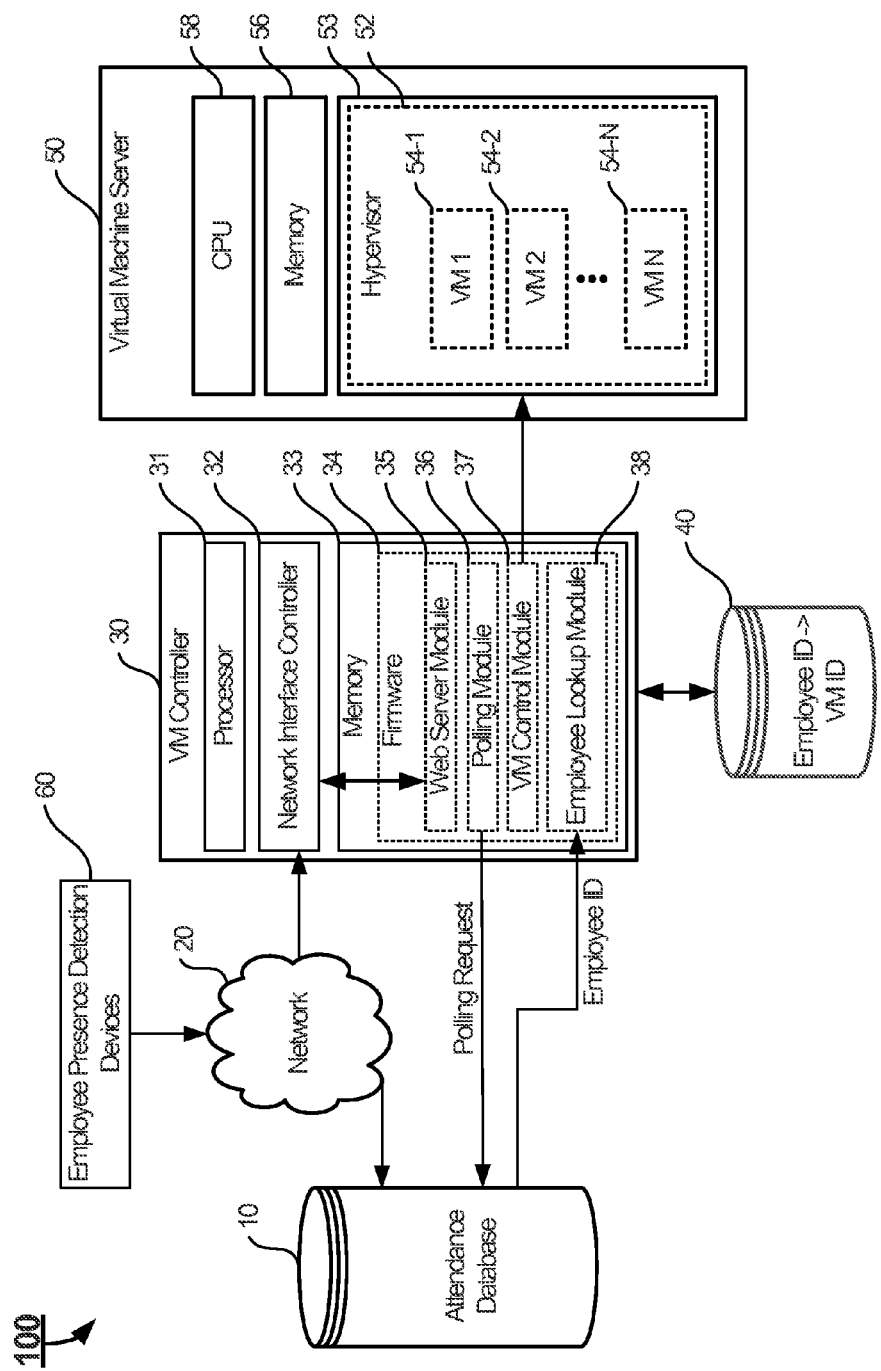
FIG. 1 schematically depicts a virtual machine control system 100 according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The term "launch a virtual machine", as used herein, generally refers to a process of instantiating or constructing a new virtual machine instance with a specific virtual machine ID on a hypervisor. Once the virtual machine is launched, the virtual machine in an "on" state. The term "shutting down a virtual machine", as used herein, generally refers to a process of deleting or destructing an existing virtual machine instance with a specific virtual machine ID on a hypervisor. Once the virtual machine is destructed, the virtual machine is in an "off" state.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The present disclosure will now be described more fully hereinafter with reference to the accompanying drawings, FIGS. 1-2, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Remote desktop virtualization is frequently used in a variety of different scenarios. For example, remote desktop virtualization may be used in distributed environments with high availability requirements and where desk-side technical support is not readily available, such as branch office and retail environments. In certain embodiments, remote desktop virtualization may be used in environments where high network latency degrades the performance of conventional client/server applications. In certain embodiments, remote desktop virtualization may be used in environments where remote access and data security requirements create conflicting requirements that can be addressed by retaining all (application) data within the data center with only display, keyboard, and mouse information communicated with the remote client. Remote desktop virtualization may be used as a means of providing access to Windows applications on non-Windows endpoints including tablets, smart phones and non-Windows-based desktop PCs and laptops. In certain embodiments, remote desktop virtualization may be used as a means of resource sharing, to provide low-cost desktop computing services in environments where providing every user with a dedicated desktop PC is either too expensive or otherwise unnecessary. As described above, the convenient access to the virtual desktops of the virtual machine presents potential wasteful consumption of energy and/or computer resources if all virtual machines are running all the times. Thus, it is desirable to keep virtual machines off when users of these virtual machines are not present at the work place, and launch a virtual machine when a user associated with the virtual machine is present at the work place.

In accordance with the purposes of present disclosure, as embodied and broadly described herein, in certain aspects, the present disclosure relates to a virtual machine control system 100 as shown in FIG. 1 according to certain embodiments of the present disclosure. The virtual machine control system 100 includes: (a) an attendance database 10, (b) a virtual machine controller 30, (c) an employee ID database 40, (d) at least one virtual machine server 50, and (e) one or more employee presence detection devices 60. In certain embodiments, the virtual machine control system 100 is used to monitor the arrivals and departure of employees at a predetermined area, and control virtual machines used by these employees. When an employee enters the predetermined area, the virtual machine control system 100 launches a virtual machine that corresponds to the employee. When an employee exits the predetermined area, the virtual machine control system 100 shuts down a virtual machine that corresponds to the employee. The virtual machine control system 100 ascertains that the virtual machines are ready when the employees arrive, and minimizes the energy and resources consumed by the virtual machines for the employees when the employees leave the predetermined area.

In certain embodiments, the attendance database 10 is configured to store employee attendance information and employee presence events. The employee presence events include an ingress event occurs when an employee enters a predetermined area, and an egress event occurs when an employee exits the predetermined area. The virtual machine server 50 includes a processor and a memory. The memory stores a hypervisor 52. When the hypervisor 52 is operating on the processor of the virtual machine server 50, a number of virtual machines 54-I, I=1, 2, . . . N may be instantiated or launched, or shut down by the virtual machine control system 100. Each of these virtual machines 54 has a virtual machine ID.

In certain embodiments, the attendance database 10 is configured to perform following operations: (a) receiving and storing the registration information of each of the employees, (b) receiving employee presence events of each of the employees from the one or more employee presence detection devices 60, (c) updating the employee presence events received in the attendance database 10, (d) maintaining the attendance information for each of the employees, (e) receiving periodical polling inquiries from the virtual machine controller 30 at a predetermined polling time interval, and (f) transmitting, in response to the polling inquiries, employee presence events to the virtual machine controller 30 when at least one employee presence event occurred to at least one employee during last predetermined polling time interval.

In certain embodiments, the employee ID database 40 is configured to perform following operations: (a) receiving and storing the registration information of each of the employees with corresponding employee IDs, (b) receiving and storing the virtual machine ID associated with each of the employees, (c) receiving one or more identification inquiries from the virtual machine controller 30 to identify a virtual machine ID based on a given employee ID, and (d) transmitting, in response to the one or more identification inquiries, the virtual machine ID associated with the employee with the employee ID to the virtual machine controller 30.

In certain embodiments, the virtual machine server 50 includes: (a) a CPU 58, (b) memory 56, and a storage 53. A hypervisor 52 is stored in the storage 53 and a plurality of virtual machines 54. The CPU 58 is a host processor which is configured to control operation of the virtual machine server 50. The CPU 58 can execute the hypervisor 52 or other applications of the virtual machine server 50. In certain embodiments, the virtual machine server 50 may run on more than one CPU as the host processor, such as two CPUs, four CPUs, eight CPUs, or any suitable number of CPUs. The memory 56 can be a volatile memory, such as the random-access memory (RAM), for storing the data and information during the operation of the virtual machine server 50. The memory 56 can be a volatile memory, such as the random-access memory (RAM), for storing the data and information during the operation of the virtual machine server 50. The storage 53 is a non-volatile data storage media for storing the hypervisor 52 and other applications of the virtual machine server 50. Examples of the storage 53 may include flash memory, memory cards, USB drives, hard drives, floppy disks, optical drives, or any other types of data storage devices.

The hypervisor 52 is a program that allows multiple virtual machine instances to run simultaneously and share a single hardware host, such as the virtual machine server 50. The hypervisor 52, when executed at the CPU 58, implements hardware virtualization techniques and allows one or more operating systems or other applications to run concurrently as guests of one or more virtual machines on the host server (i.e. the virtual machine server 50). The hypervisor 52 allows each user to run an operating system instance as a virtual machine. In certain embodiments, the hypervisor 52 may be of various types and designs, such as MICROSOFT HYPER-V, XEN, VMWARE ESX, or other types of hypervisors.

As shown in FIG. 1, when the hypervisor instance 52 runs on the virtual machine server 50, the hypervisor 52 emulates one or more virtual computer machine, including a virtual CPU, and a virtual memory. One or more virtual machines 54-1, 54-2, 54-3, . . . , and 54-N can operate in the hypervisor 52. Each of the virtual machines 54-*i*, i=1, 2, . . . , N can run a virtual machine operation system (VMOS), such as WINDOWS or LINUX. For brevity, unless otherwise noted, a virtual machine and the virtual machines operating system run in that virtual machines are collectively referred to as a virtual machine (such as each virtual machines 54-*i*, i=1, 2, . . . , N shown in FIG. 1).

In one embodiment, the virtual machines 54 include N virtual machines 54, and they are a first virtual machine 54-1, a second virtual machine 54-2, the third virtual machine 54-3, . . . , and a N-th virtual machine 54-N. In certain embodiments, one or more of virtual desktops are running on each of the virtual machines.

In certain embodiments, the employee presence detection devices 60 are used to detect the employee presence events of the employees. Each of the employees is assigned an employee ID. When an employee enters or leaves a predetermined area, an employee presence event has occurred to the employee and this employee presence event along with the employee ID assigned to the employee is detected by the employee presence detection devices 60. The employee presence detection devices 60 transmit the employee presence event, and the corresponding employee ID to the attendance database 10 over a network 20 as shown in FIG. 1.

In certain embodiments, the employee presence detection devices 60 include: (a) a security control system of a predetermined area configured to detect the entering and exiting of the employees individually, (b) a proximity detection device configured to detect the entering and exiting a vicinity of the predetermined area of the employees individually, (c) a wireless device detection device configured to detect the presence of the employees in the coverage area of the predetermined area individually, (d) an online virtual machine control system configured to detect the logins and logouts of the employees individually, (e) an employee working schedule control system configured to control the launching and shutting down a virtual machine according a working schedule of an employee associated with the virtual machine, and (f) other presence detection devices configured to detect presence at the predetermined area for each of the employees individually.

In certain embodiments, the employee presence event includes: (a) an ingress event when the employee enters the predetermined area, and (b) an egress event when the employee exits the predetermined area. The employee presence detection devices 60 are configured to detect an ingress event occurred to the employee: when the employee enters a security system of the predetermined area, when the employee is automatically connected to a wireless communication system at the predetermined area, when the employee logs into a virtual machine remotely, and when current time reaches the employee's end of predetermined working schedule. The employee presence detection devices 60 are configured to detect an egress event occurred to an employee when the employee exits a security system of the predetermined area, when the employee is automatically disconnected to a Wi-Fi connection system at the predetermined area, when the employee logs out a virtual machine remotely, and when current time reaches the end of the employee's predetermined working schedule. Once the employee presence detection devices 60 detects one or more employee presence events, the employee presence detection devices 60 transmit the one or more employee presence events detected to the attendance database 10 along with the corresponding employee IDs respectively.

In certain embodiments, the virtual machine controller 30 includes: (a) a processor 31, (b) a network interface controller 32, and (c) a memory 33. The processor 31 is configured to perform virtual machine control system 100 functions. The network interface controller 32 is configured to connect the virtual machine controller 30 to a network 20. The memory 33 stores firmware 34 of the virtual machine controller 30. The firmware 34 of the virtual machine controller 30 includes: (a) a polling module 36, (b) a virtual machine control module 37, and (c) an employee ID lookup module 38. In certain embodiments, the polling module 36 is configured to transmit polling inquiries periodically to the attendance database 10 at a predetermined polling time interval to retrieve any employee presence events of the employees detected by the employee presence detection devices 60. When the employee presence events are detected by the employee presence detection devices 60, the attendance database 10 transmits all employee presence events occurred to the employees during the last polling time period along with their corresponding employee IDs to the employee ID lookup module 38. The employee ID lookup module 38 then sends an identification inquiries to the employee ID database 40 to performs a look-up using the employee IDs received in to identify the virtual machine IDs based on the corresponding employee IDs whose employee presence events were detected during the last predetermined polling time interval. In response to the look-up, the employee ID database 40 transmits the virtual machine ID associated with the employee with the employee ID to the virtual machine control module 37. The virtual machine control module 37 will perform virtual machine controls to the corresponding virtual machines based on the employee presence events, the employee IDs, and their corresponding virtual machines with the identified virtual machine IDs. When the employee presence event occurred to the employee is an ingress event and when the corresponding virtual machine is in an "off" state, the virtual machine control module 37 launches the virtual machine associated with the employee ID. When the employee presence event occurred to the employee is an egress event and when the corresponding virtual machine is in an "on" state, the virtual machine control module 37 shuts down the virtual machine associated with the employee ID.

In certain embodiments, the firmware 34 of the virtual machine controller 30 is programmed to perform following operations: (a) registering the employees with their employee IDs, (b) storing registration information of each of the employees in the attendance database 10, (c) associating one or more of the virtual machines to each of the employees, (d) storing virtual machine association information between the virtual machines 54 and the employees in the employee ID database 40, (e) transmitting polling inquiries periodically to the attendance database 10 to retrieve employee presence events of the employees detected by the one or more employee presence detection devices 60 in a predetermined polling time interval, (f) identifying, in response to a detected employee presence event of an employee, the virtual machine ID associated with the employee ID of the employee through look-up in the employee ID database 40, and (g) instructing the hypervisor 52 to launch the virtual machine with the virtual machine ID associated the employee ID when the employee presence event occurred to the employee is an ingress event and when the virtual machine is in an "off" state, and shut down the virtual machine with the virtual machine ID associated the employee ID when the employee presence event occurred to the employee is an egress event and when the virtual machine is in an "on" state.

When the virtual machine control system 100 determines to launch or shut down a virtual machine as identified, the launching or the shutting down may not necessarily launch or shut down immediately. An optional launching delay T1 may be introduced to delay the launching of the virtual machine identified when the virtual machine control system 100 instructs the hypervisor 52 to launch the virtual machine identified. Similarly, an optional shutting down delay T2 may be introduced to delay the shutting down of the virtual machine identified when the virtual machine control system 100 instructs the hypervisor 52 to shut down the virtual machine identified.

In certain embodiments, for example, when an employee drives into a parking garage, and a parking management system may detect the employee's presence at the parking garage. On one hand, it may take certain time (e.g. T-walk) for the employee to reach his/her office. On the other hand, it may take certain time (e.g. T-launch) for the virtual machine to launch and be ready for the employee to use. The optional launching delay T1 may be defined as: (T-walk)-(T-launch) such that the virtual machine will be ready when the employee arrives to his/her office. This optional launching delay T1 may be adjusted by the work load of the virtual machine identified at the time, or the applications were running when the virtual machine identified was shut down the previous day.

In certain embodiments, for example, when an employee leaves his or her office and his egress event is detected by a wireless communication system, the virtual machine control system 100 determines to shut down one or more virtual machines associated with employee. The virtual machine identified may not be shutting down immediately because there may be some applications running and require gracefully shut down. On the other hand, in order to avoid shutting down the virtual machine when the employee will just leave the office for a quick meeting, or pick up something from the car, it should wait certain time (e.g. T-delay).

The optional launching delay T1 and the optional shutting down delay T2 for each employee may be set up at the virtual machine control system 100 individually, and are saved in the virtual machine control system 100.

Figure 2:
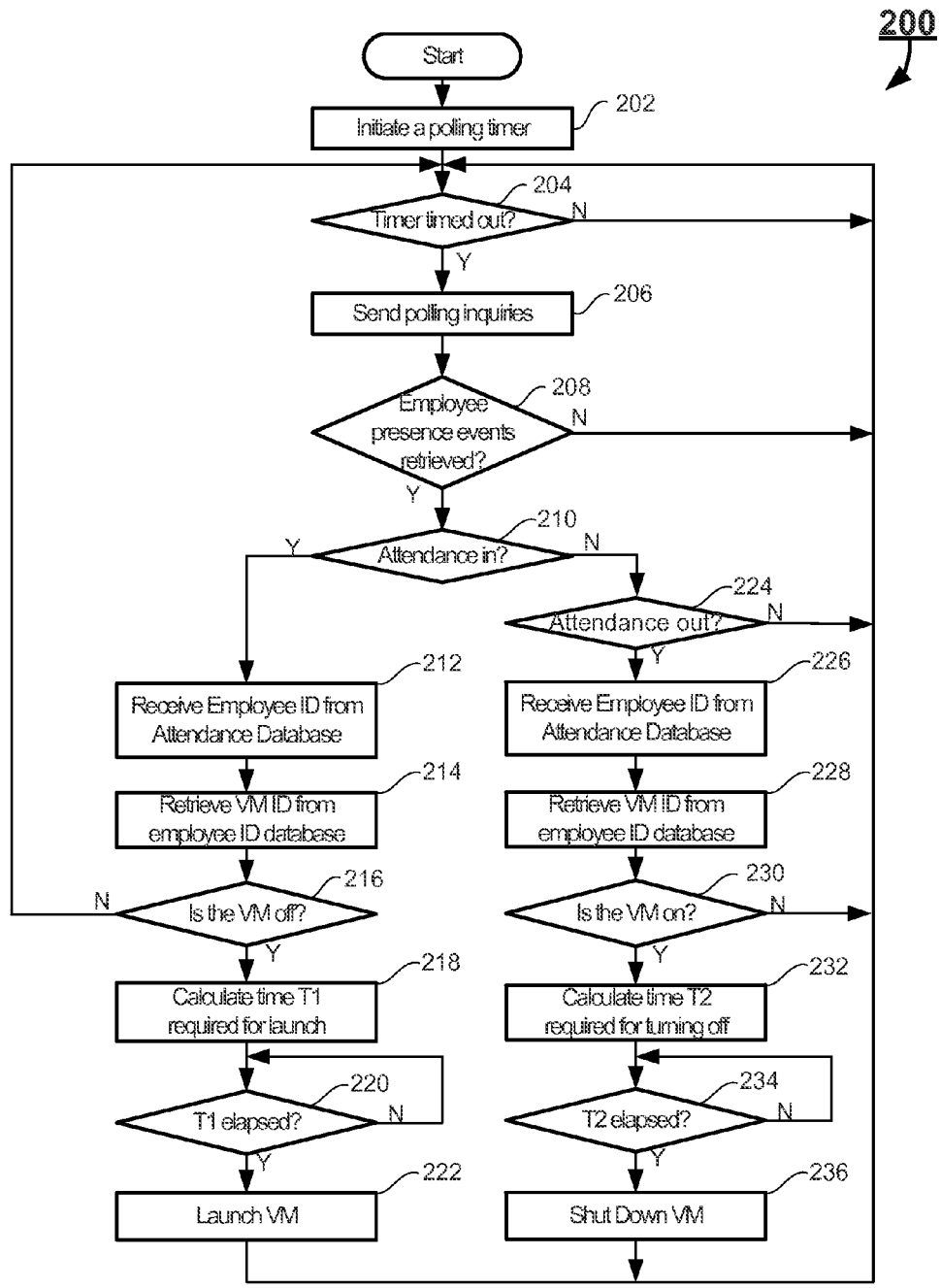
FIG. 2 shows a flow chart of virtual machine control system according to certain embodiments of the present disclosure.

FIG. 2 shows a flow chart of virtual machine control system 100 according to certain embodiments of the present disclosure.

At operation 202, a program of the virtual machine control system 100 is started and a polling timer is initiated. In one embodiment, the polling time period may be set at one minute. In another embodiment, the polling time period may be set at ten seconds. In certain embodiments, the polling time period may be set at other time lengths. In one embodiment, the polling time period is set at a value when the employee presence detection devices 60 detect no more than one employee presence event during the polling time period.

At operation 204, the virtual machine control system 100 checks if the polling timer is timed out. When the polling timer is not timed out, the program goes back to operation 204 and continues to wait. When the polling timer is timed out, the program continues to operation 206.

At operation 206, the virtual machine control system 100 sends a polling inquiry to the attendance database 10 to retrieve employee presence events of the employees detected by the employee presence detection devices 60.

At operation 208, the virtual machine control system 100 checks whether the virtual machines controller 30 receives any employee presence events of the employees detected by the employee presence detection devices 60 during the last polling time period. When there is no employee presence event occurred during last polling time period, the program goes back to operation 204 and continues to wait. When at least one employee presence event occurred during last polling time period, the program continues 210 and continues to wait.

At operation 210, when more than one employee presence events occurred during the last polling time period, the virtual machine control system 100 goes through all employee presence events one at a time. The virtual machine control system 100 checks whether the employee presence event received is an ingress event or an egress event. When an ingress event occurred to an employee, the program goes to operation 212. When an egress event occurred to an employee, the program goes to operation 224.

At operation 212, the employee lookup module 38 receives an employee ID that corresponds to the employee who had the ingress event from the attendance database 10.

At operation 214, the employee lookup module 38 retrieves one or more virtual machine IDs associated with the employee, and sends the one or more virtual machine IDs retrieved to the virtual machines control module 37.

At operation 216, the virtual machines control module 37 checks operation status of the virtual machines identified by the one or more virtual machine IDs retrieved. If two or more virtual machines are identified, then the virtual machines control module 37 checks operation status of these virtual machines one at a time. If the virtual machine identified is operating or in an "on" state, the program goes back to operation 204 and continues to wait. If the virtual machine identified is not operating or in an "Off" state, the program continues to operation 218 to launch the virtual machine identified.

At operation 218, the virtual machine control system 100 retrieves the optional launching delay T1, and calculates the actual time delay based on the current virtual machines loads and applications running when the virtual machines was shut down on the previous day, and start a launch timer.

At operation 220, the program loops back to operation 220 until the launch timer is timed out, and then the program continues to operation 222.

At operation 222, the virtual machine control module 37 sends instructions to the hypervisor 50 to launch the virtual machine identified. The program continues to operation 204 after the virtual machine identified is launched.

At operation 224, the virtual machine control system 100 checks whether the employee presence event received is an egress event. When an egress event occurred to an employee, the program goes to operation 226. Otherwise, the program goes to operation 204.

At operation 226, the employee lookup module 38 receives an employee ID that corresponds to the employee who had the egress event from the attendance database 10.

At operation 228, the employee lookup module 38 retrieves one or more virtual machine IDs associated with the employee, and sends the one or more virtual machine IDs retrieved to the virtual machines control module 37.

At operation 230, the virtual machines control module 37 checks operation status of the virtual machines identified by the one or more virtual machine IDs retrieved. If more than one virtual machines are identified, then the virtual machines control module 37 checks operation status of these virtual machines one at a time. If the virtual machine identified is not operating or in an "Off" state, the program goes back to operation 204 and continues to wait. If the virtual machine identified is operating or in an "On" state, the program continues to operation 232 to shut down the virtual machine identified.

At operation 232, the virtual machine control system 100 retrieves the optional shutting down delay T2, calculates the actual time delay based on current loads of the virtual machines, and starts a shut-down timer.

At operation 234, the program loops back to operation 234 until the shut-down timer is timed out, and then the program continues to operation 236.

At operation 236, the virtual machine control module 37 sends instructions to the hypervisor 50 to shut down the virtual machine identified. The program continues to operation 204 after the virtual machine identified is shut down.

In another aspect, the present disclosure relates to a computer-implemented method in a virtual machine control system 100. The computer-implemented method includes following operations: (a) registering all employees, with each of the employees assigned an employee ID, (b) storing registration information of each of the employees in an attendance database 10, (c) associating one or more of a virtual machines 50 to each of the employees, with each of the virtual machines assigned a virtual machine ID, (d) storing virtual machine association information between the virtual machines and the employees in an employee ID database 40, (e) transmitting polling inquiries periodically to the attendance database 10 to retrieve employee presence events of the employees detected by one or more employee presence detection devices 60 in a predetermined polling time interval, with the employee presence events having an ingress event when an employee enters a predetermined area, and an egress event when the employee exits the predetermined area, (f) identifying, in response to a detected employee presence event of an employee, the virtual machine ID associated with the employee ID of the employee through look-up in the employee ID database 40, and (g) instructing a hypervisor 52 to launch the virtual machine with the virtual machine ID associated with the employee ID when the employee presence event occurred to the employee is an ingress event and when the virtual machine is in an "off" state, and shut down the virtual machine with the virtual machine ID associated with the employee ID when the employee presence event occurred to the employee is an egress event and when the virtual machine is in an "on" state.

In certain embodiments, the virtual machine control system 100 includes: (a) the one or more employee presence detection devices 60 configured to detect employee presence events of the employees, (b) the attendance database 10 configured to store employee presence events for each of the employees, (c) the employee ID database 40 configured to store employee IDs and one or more virtual machines associated with each of the employees, (d) at least one virtual machine server 50 having the hypervisor 52, and the virtual machines 54 are running on the hypervisor 52, and (e) a virtual machine controller 30 configured to perform virtual machine control functions of the virtual machine control system 100.

In certain embodiments, the virtual machine controller 30 includes a processor 31, a network interface controller 32, and a memory 33. The processor 31 performs various functions of the virtual machine control system 100. The network interface controller 32 connects the virtual machine controller 30 to a network 20. The memory 33 stores firmware 34. The firmware 34 includes: a polling module 36, an employee ID lookup module 38, and a virtual machine control module 37. The polling module 36 transmits polling inquiries periodically to the attendance database 10 at the predetermined polling time interval to retrieve any employee presence events of the employees detected by the one or more employee presence detection devices 60. The employee ID lookup module 38 is used for virtual machine ID look up, and identifying the virtual machine IDs based on the corresponding employee IDs whose employee presence events were detected during the last predetermined polling time interval. The virtual machine control module 37 is to perform control functions of the virtual machine controller 30. The functions of the virtual machine controller 30 include: (a) launching the virtual machine associated with the employee when the employee presence event occurred to the employee is an ingress event and when the corresponding virtual machine is in an "off" state, and (b) shutting down the virtual machine associated with the employee through the lookup when the employee presence event occurred to the employee is an egress event and when the corresponding virtual machine is in an "on" state.

In certain embodiments, the firmware 34 of the virtual machine controller 30 also includes a web server module 35 to allow an administrator to perform virtual machine control system 100 functions over the network 20.

In certain embodiments, the attendance database 10 is configured to: (a) receive and store the registration information of each of the employees, (b) receive employee presence events of each of the employees from the one or more employee presence detection devices 60, (c) update the employee presence events received in the attendance database 10, (d) maintain the attendance information for each of the employees, (e) receive periodical polling inquiries from the virtual machine controller 30 at the predetermined polling time interval, and (f) transmit, in response to the polling inquiries, the employee presence events occurred during last predetermined polling time interval, along with the employee ID to the virtual machine controller 30.

In certain embodiments, the employee ID database 40 is configured to: (a) receive and store the registration information of each of the employees with corresponding employee IDs, (b) receive and store the virtual machine ID associated with each of the employees, (c) receive one or more identification inquiries from the virtual machine controller 30 to identify a virtual machine ID based on a given employee ID, and (d) in response to the one or more identification inquiries, transmit the virtual machine ID associated with the employee with the employee ID to the virtual machine controller 30.

In certain embodiments, each of the one or more employee presence detection devices is configured to: determine that the detected employee presence event of the one of the employees is the ingress event when: (a) the employee enters the security control system of the predetermined area, (b) the employee's presence is detected by the proximity detection device of the predetermined area, (c) the employee's presence is detected by the wireless device detection device of the predetermined area, (d) the employee logs into a virtual machine remotely, or (e) a current time reaches the employee's start of predetermined working schedule; determine that the detected employee presence event of the one of the employees is the egress event when: (a) the employee exits the security control system of the predetermined area, (b) the employee's departure is detected by the proximity detection device of the predetermined area, (c) the employee's departure is detected by the wireless device detection device of the predetermined area, (d) the employee logs out of the virtual machine remotely, or (e) the current time reaches the employee's end of predetermined working schedule; and transmit the detected employee presence event of the one of the employees to the attendance database.

In yet another aspect, the present disclosure relates to a non-transitory computer storage medium. In certain embodiments, the non-transitory computer storage medium stores computer-executable instructions. When the computer-executable instructions are executed by a processor 31 of a virtual machine controller 30, the computer-executable instructions cause the processor 31 to perform following operations: (a) registering all employees, with each of the employees assigned an employee ID, (b) storing registration information of each of the employees in an attendance database 10, (c) associating one or more of a virtual machines 50 to each of the employees, with each of the virtual machines assigned a virtual machine ID, (d) storing virtual machine association information between the virtual machines and the employees in an employee ID database 40, (e) transmitting polling inquiries periodically to the attendance database 10 to retrieve employee presence events of the employees detected by one or more employee presence detection devices 60 in a predetermined polling time interval, with the employee presence events having an ingress event when an employee enters a predetermined area, and an egress event when the employee exits the predetermined area, (f) identifying, in response to a detected employee presence event of an employee, the virtual machine ID associated with the employee ID of the employee through look-up in the employee ID database 40, and (g) instructing a hypervisor 52 to launch the virtual machine with the virtual machine ID associated with the employee ID when the employee presence event occurred to the employee is an ingress event and when the virtual machine is in an "off" state, and shut down the virtual machine with the virtual machine ID associated with the employee ID when the employee presence event occurred to the employee is an egress event and when the virtual machine is in an "on" state.

In certain embodiments, the virtual machine control system 100 includes: (a) the one or more employee presence detection devices 60 configured to detect employee presence events of the employees, (b) the attendance database 10 configured to store employee presence events for each of the employees, (c) the employee ID database 40 configured to store employee IDs and one or more virtual machines associated with each of the employees, (d) at least one virtual machine server 50 having the hypervisor 52, and the virtual machines 54 are running on the hypervisor 52, and (e) a virtual machine controller 30 configured to perform virtual machine control functions of the virtual machine control system 100.

In certain embodiments, the virtual machine controller 30 includes a processor 31, a network interface controller 32, and a memory 33. The processor 31 performs various functions of the virtual machine control system 100. The network interface controller 32 connects the virtual machine controller 30 to a network 20. The memory 33 stores firmware 34. The firmware 34 includes: a polling module 36, an employee ID lookup module 38, and a virtual machine control module 37. The polling module 36 transmits polling inquiries periodically to the attendance database 10 at the predetermined polling time interval to retrieve any employee presence events of the employees detected by the one or more employee presence detection devices 60. The employee ID lookup module 38 is used for virtual machine ID look up, and identifying the virtual machine IDs based on the corresponding employee IDs whose employee presence events were detected during the last predetermined polling time interval. The virtual machine control module 37 is to perform control functions of the virtual machine controller 30. The functions of the virtual machine controller 30 include: (a) launching the virtual machine associated with the employee when the employee presence event occurred to the employee is an ingress event and when the corresponding virtual machine is in an "off" state, and (b) shutting down the virtual machine associated with the employee through the lookup when the employee presence event occurred to the employee is an egress event and when the corresponding virtual machine is in an "on" state.

In certain embodiments, the firmware 34 of the virtual machine controller 30 also includes a web server module 35 to allow an administrator to perform virtual machine control system 100 functions over the network 20.

In certain embodiments, the attendance database 10 is configured to: (a) receive and store the registration information of each of the employees, (b) receive employee presence events of each of the employees from the one or more employee presence detection devices 60, (c) update the employee presence events received in the attendance database 10, (d) maintain the attendance information for each of the employees, (e) receive periodical polling inquiries from the virtual machine controller 30 at the predetermined polling time interval, and (f) transmit, in response to the polling inquiries, the employee presence events occurred during last predetermined polling time interval, along with the employee ID to the virtual machine controller 30.

In certain embodiments, the employee ID database 40 is configured to: (a) receive and store the registration information of each of the employees with corresponding employee IDs, (b) receive and store the virtual machine ID associated with each of the employees, (c) receive one or more identification inquiries from the virtual machine controller 30 to identify a virtual machine ID based on a given employee ID, and (d) in response to the one or more identification inquiries, transmit the virtual machine ID associated with the employee with the employee ID to the virtual machine controller 30.

In certain embodiments, each of the one or more employee presence detection devices 60 is configured to: determine that the detected employee presence event of the one of the employees is the ingress event when: (a) the employee enters the security control system of the predetermined area, (b) the employee's presence is detected by the proximity detection device of the predetermined area, (c) the employee's presence is detected by the wireless device detection device of the predetermined area, (d) the employee logs into a virtual machine remotely, or (e) a current time reaches the employee's start of predetermined working schedule; determine that the detected employee presence event of the one of the employees is the egress event when: (a) the employee exits the security control system of the predetermined area, (b) the employee's departure is detected by the proximity detection device of the predetermined area, (c) the employee's departure is detected by the wireless device detection device of the predetermined area, (d) the employee logs out of the virtual machine remotely, or (e) the current time reaches the employee's end of predetermined working schedule; and transmit the detected employee presence event of the one of the employees to the attendance database 10.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A virtual machine control system, comprising:
    a virtual machine controller comprising a processor and a memory storing computer executable instructions, wherein the computer executable instructions, when executed at the processor, are configured to
    register a plurality of employees, wherein each of the plurality of employees is assigned an employee ID;
    store information of the registration of each of the plurality of employees in an attendance database;
    associate one or more of a plurality of virtual machines to each of the plurality of employees, wherein each of the plurality of virtual machines has a virtual machine ID;
    store virtual machine association information between the plurality of virtual machines and the plurality of employees in an employee ID database;
    transmit polling inquiries periodically to the attendance database to retrieve employee presence events of the plurality of employees detected by one or more employee presence detection devices in a predetermined polling time interval, wherein the employee presence events include an ingress event when one of the plurality of employees enters a predetermined area, and an egress event when the one of the plurality of employees exits the predetermined area;
    identify, in response to a detected employee presence event of the one of the plurality of employees, the virtual machine ID associated with the employee ID of the one of the plurality of employees through look-up of the virtual machine association information of the employee ID database; and
    instruct a hypervisor to
    launch, using the virtual machine association information, a virtual machine with the virtual machine ID associated with the employee ID when the detected employee presence event of the one of the plurality of employees is the ingress event and when the virtual machine is in an off state;
    shut down the virtual machine with the virtual machine ID associated with the employee ID when the detected employee presence event of the one of the plurality of employees is the egress event and when the virtual machine is in an on state; and
    apply a launching delay T1 based on current virtual machine loads and applications running on the hypervisor when the virtual machine was shut down during an immediately prior on state to delay start of the launching of the virtual machine when the virtual machine control system instructs the hypervisor to launch the virtual machine.

2. The virtual machine control system of claim 1, further comprising:
    the one or more employee presence detection devices configured to detect employee presence events of the plurality of employees;
    the attendance database configured to store employee presence events for each of the plurality of employees;
    the employee ID database configured to store employee IDs of the plurality of employees and one or more virtual machines associated with each of the plurality of employees; and
    at least one virtual machine server having the hypervisor and the plurality of virtual machines running on the hypervisor.

3. The virtual machine control system of claim 1, wherein the one or more employee presence detection devices comprise:
    a security control system of a predetermined area configured to detect the entering and exiting of the plurality of employees individually;
    a proximity detection device configured to detect the entering and exiting a vicinity of the predetermined area for each of the plurality of employees individually;
    a wireless device detection device configured to detect a presence at and a departure from the predetermined area for each of the plurality of employees individually;
    an online virtual machine control system configured to detect logins and logouts of the plurality of employees individually; and
    an employee working schedule control system configured to control the launching and the shutting down of a virtual machine according to a working schedule of an employee of the plurality of employees associated with the virtual machine.

4. The virtual machine control system of claim 3, wherein each of the one or more employee presence detection devices is configured to:
  determine that the detected employee presence event of the one of the plurality of employees is the ingress event when:
    the one of the plurality of employees enters the security control system of the predetermined area;
    the presence event of the one of the plurality of employees is detected by the proximity detection device of the predetermined area;
    the presence event is detected by the wireless device detection device of the predetermined area;
    the one of the plurality of employees logs into a virtual machine remotely; or
    a current time reaches the one of the plurality of employees start of predetermined working schedule;
  determine that the detected employee presence event of the one of the plurality of employees is the egress event when:
    the one of the plurality of employees exits the security control system of the predetermined area;
    the one of the plurality of employees departure is detected by the proximity detection device of the predetermined area;
    the one of the plurality of employees departure is detected by the wireless device detection device of the predetermined area;
    the one of the plurality of employees logs out of the virtual machine remotely; or
    the current time reaches the one of the plurality of employees end of predetermined working schedule; and
  transmit the detected employee presence event of the one of the plurality of employees to the attendance database.

5. The virtual machine control system of claim 1, wherein the attendance database is configured to:
  receive and store the information of the registration of each of the plurality of employees;
  receive employee presence events of each of the plurality of employees from the one or more employee presence detection devices;
  update the employee presence events received in the attendance database;
  maintain attendance information for each of the plurality of employees;
  receive periodical polling inquiries from the virtual machine controller at the predetermined polling time interval; and
  transmit, in response to the polling inquiries, the employee presence events occurred during last predetermined polling time interval, along with the employee ID to the virtual machine controller.

6. The virtual machine control system of claim 1, wherein the employee ID database is configured to:
  receive and store the information of the registration of each of the plurality of employees with corresponding employee IDs;
  receive and store the virtual machine ID associated with each of the plurality of employees;
  receive one or more identification inquiries from the virtual machine controller to identify a virtual machine ID based on a given employee ID; and
  transmit, in response to the one or more identification inquiries, the virtual machine ID associated with the one of the plurality of employees with the employee ID to the virtual machine controller.

7. The virtual machine control system of claim 1, wherein the virtual machine controller further comprises a network interface controller configured to connect the virtual machine controller to a network; and
the computer executable instructions comprise firmware, wherein the firmware comprises:
  a polling module configured to transmit the polling inquiries periodically to the attendance database at the predetermined polling time interval to retrieve the employee presence events of the plurality of employees detected by the one or more employee presence detection devices;
  an employee ID lookup module to identify the virtual machine IDs based on the corresponding employee IDs of the plurality of employees whose employee presence events were detected during the last predetermined polling time interval; and
  a virtual machine control module for launching the virtual machine associated with the one of the plurality of employees when the detected employee presence event of the one of the plurality of employees is the ingress event and when the corresponding virtual machine is in the off state; and shutting down the virtual machine associated with the one of the plurality of employees through the lookup when the detected employee presence event of the one of the plurality of employees is the egress event and when the corresponding virtual machine is in the on state.

8. The virtual machine control system of claim 7, wherein the firmware further comprises a web server module configured to allow an administrator to perform virtual machine control system functions over the network.

9. The virtual machine control system of claim 1, wherein a shutting down delay T2 is applied to delay the shutting down of the virtual machine when the virtual machine control system instructs the hypervisor to shut down the virtual machine.

10. A computer-implemented method for a virtual machine control system, the method comprising:
  registering, by a virtual machine controller, a plurality of employees, wherein each of the plurality of employees is assigned an employee ID;
  storing, by the virtual machine controller, information of the registration of each of the plurality of employees in an attendance database;
  associating, by the virtual machine controller, one or more of a plurality of virtual machines to each of the plurality of employees, wherein each of the plurality of virtual machines has a virtual machine ID;
  storing, by the virtual machine controller, virtual machine association information between the plurality of virtual machines and the plurality of employees in an employee ID database;
  transmitting, by the virtual machine controller, polling inquiries periodically to the attendance database to retrieve employee presence events of the plurality of employees detected by one or more employee presence detection devices in a predetermined polling time interval, wherein the employee presence events include an ingress event when one of the plurality of employees enters a predetermined area, and an egress event when the one of the plurality of employees exits the predetermined area;
  in response to a detected employee presence event of the one of the plurality of employees, identifying, by the virtual machine controller, the virtual machine ID associated with the employee ID of the one of the plurality of employees through look-up of the virtual machine association information of the employee ID database; and instructing, by the virtual machine controller, a hypervisor to launch, using the virtual machine association information, a virtual machine with the virtual machine ID associated with the employee ID when the detected employee presence event of the one of the plurality of employees is the ingress event and when the virtual machine is in an off state;

shut down the virtual machine with the virtual machine ID associated with the employee ID when the detected employee presence event of the one of the plurality of employees is the egress event and when the virtual machine is in an on state; and apply a launching delay T1 based on current virtual machine loads and applications running on the hypervisor when the virtual machine was shut down during an immediately prior on state to delay start of the launching of the virtual machine when the virtual machine control system instructs the hypervisor to launch the virtual machine.

11. The computer-implemented method of claim 10, wherein the virtual machine control system comprises:
the virtual machine controller;
the one or more employee presence detection devices to detect the employee presence events of the plurality of employees;
the attendance database configured to store the employee presence events for each of the plurality of employees;
the employee ID database configured to store employee IDs of the plurality of employees and one or more virtual machines associated with each of the plurality of employees; and
at least one virtual machine server having the hypervisor and the plurality of virtual machines running on the hypervisor.

12. The computer-implemented method of claim 10, wherein the virtual machine controller comprises:
a processor;
a network interface controller configured to connect the virtual machine controller to a network; and
a memory storing firmware, wherein the firmware comprises:
a polling module configured to transmit the polling inquiries periodically to the attendance database at the predetermined polling time interval to retrieve the employee presence events of the plurality of employees detected by the one or more employee presence detection devices;
an employee ID lookup module to identify the virtual machine IDs based on the corresponding employee IDs of the plurality of employees whose employee presence events were detected during the last predetermined polling time interval; and
a virtual machine control module for launching the virtual machine associated with the one of the plurality of employees when the detected employee presence event of the one of the plurality of employees is the ingress event and when the corresponding virtual machine is in the off state; and shutting down the virtual machine associated with the one of the plurality of employees through the lookup when the detected employee presence event of the one of the plurality of employees is the egress event and when the corresponding virtual machine is in the on state.

13. The computer-implemented method of claim 12, wherein the firmware further comprises a web server module configured to allow an administrator to perform virtual machine control system functions over the network.

14. The computer-implemented method of claim 10, wherein the attendance database is configured to:
receive and store the information of the registration of each of the plurality of employees;
receive employee presence events of each of the plurality of employees from the one or more employee presence detection devices;
update the employee presence events received in the attendance database;
maintain attendance information for each of the plurality of employees;
receive periodical polling inquiries from the virtual machine controller at the predetermined polling time interval; and
transmit, in response to the polling inquiries, the employee presence events occurred during last predetermined polling time interval, along with the employee ID to the virtual machine controller.

15. The computer-implemented method of claim 10, wherein the employee ID database is configured to:
receive and store the information of the registration of each of the plurality of employees with corresponding employee IDs;
receive and store the virtual machine ID associated with each of the plurality of employees;
receive one or more identification inquiries from the virtual machine controller to identify a virtual machine ID based on a given employee ID; and
transmit, in response to the one or more identification inquiries, the virtual machine ID associated with the one of the plurality of employees with the employee ID to the virtual machine controller.

16. The computer-implemented method of claim 10, wherein the one or more employee presence detection devices comprise:
a security control system of a predetermined area configured to detect the entering and exiting of the plurality of employees individually;
a proximity detection device configured to detect the entering and exiting a vicinity of the predetermined area for each of the plurality of employees individually;
a wireless device detection device configured to detect a presence at and a departure from the predetermined area for each of the plurality of employees individually;
an online virtual machine control system configured to detect logins and logouts of the plurality of employees individually; and
an employee working schedule control system configured to control the launching and the shutting down of a virtual machine according to a working schedule of an employee of the plurality of employees associated with the virtual machine.

17. The computer-implemented method of claim 16, wherein each of the one or more employee presence detection devices is configured to:
determine that the detected employee presence event of the one of the plurality of employees is the ingress event when:
the one of the plurality of employees enters the security control system of the predetermined area;

the presence event of the one of the plurality of employees is detected by the proximity detection device of the predetermined area;

the presence event is detected by the wireless device detection device of the predetermined area;

the one of the plurality of employees logs into a virtual machine remotely; or a current time reaches the one of the plurality of employees start of predetermined working schedule;

determine that the detected employee presence event of the one of the plurality of employees is the egress event when:

the one of the plurality of employees exits the security control system of the predetermined area;

the one of the plurality of employees departure is detected by the proximity detection device of the predetermined area;

the one of the plurality of employees departure is detected by the wireless device detection device of the predetermined area;

the one of the plurality of employees logs out of the virtual machine remotely; or the current time reaches the one of the plurality of employees end of predetermined working schedule; and transmit the detected employee presence event of the one of the plurality of employees to the attendance database.

18. The computer-implemented method of claim 10, wherein a shutting down delay T2 is applied to delay the shutting down of the virtual machine when the virtual machine control system instructs the hypervisor to shut down the virtual machine.

19. A non-transitory computer storage medium having computer-executable instructions stored thereon which, when executed by a processor of a virtual machine controller, cause the processor to perform following operations:

registering a plurality of employees, wherein each of the plurality of employees is assigned an employee ID;

storing information of the registration of each of the plurality of employees in an attendance database;

associating one or more of a plurality of virtual machines to each of the plurality of employees, wherein each of the plurality of virtual machines has a virtual machine ID;

storing virtual machine association information between the plurality of virtual machines and the plurality of employees in an employee ID database;

transmitting polling inquiries periodically to the attendance database to retrieve employee presence events of the plurality of employees detected by one or more employee presence detection devices in a predetermined polling time interval, wherein the employee presence events include an ingress event when one of the plurality of employees enters a predetermined area, and an egress event when the one of the plurality of employees exits the predetermined area;

identifying, in response to a detected employee presence event of one of the plurality of employees, the virtual machine ID associated with the employee ID of the one of the plurality of employees through look-up of the virtual machine association information of the employee ID database; and instructing a hypervisor to launch, using the virtual machine association information, a virtual machine with the virtual machine ID associated with the employee ID when the detected employee presence event of the one of the plurality of employees is the ingress event and when the virtual machine is in an off state;

shut down the virtual machine with the virtual machine ID associated with the employee ID when the detected employee presence event of the one of the plurality of employees is the egress event and when the virtual machine is in an on state; and apply a launching delay T1 based on current virtual machine loads and applications running on the hypervisor when the virtual machine was shut down during an immediately prior on state to delay start of the launching of the virtual machine when the virtual machine control system instructs the hypervisor to launch the virtual machine.

20. The non-transitory computer storage medium of claim 19, wherein the virtual machine controller comprises:

the processor;

a network interface controller configured to connect the virtual machine controller to a network; and a memory storing firmware, wherein the firmware comprises:

a polling module configured to transmit the polling inquiries periodically to the attendance database at the predetermined polling time interval to retrieve the employee presence events of the plurality of employees detected by the one or more employee presence detection devices;

an employee ID lookup module to identify the virtual machine IDs based on the corresponding employee IDs of the plurality of employees whose employee presence events were detected during the last predetermined polling time interval; and a virtual machine control module for launching the virtual machine associated with the one of the plurality of employees when the detected employee presence event of the one of the plurality of employees is the ingress event and when the corresponding virtual machine is in the off state; and shutting down the virtual machine associated with the one of the plurality of employees through the lookup when the detected employee presence event of the one of the plurality of employees is the egress event and when the corresponding virtual machine is in the on state.

21. The non-transitory computer storage medium of claim 19, wherein the attendance database is configured to:

receive and store the information of the registration of each of the plurality of employees;

receive employee presence events of each of the plurality of employees from the one or more employee presence detection devices;

update the employee presence events received in the attendance database;

maintain attendance information for each of the plurality of employees;

receive periodical polling inquiries from the virtual machine controller at the predetermined polling time interval; and transmit, in response to the polling inquiries, the employee presence events occurred during last predetermined polling time interval, along with the employee ID to the virtual machine controller.

22. The non-transitory computer storage medium of claim 19, wherein the employee ID database is configured to:

receive and store the information of the registration of each of the plurality of employees with corresponding employee IDs;

receive and store the virtual machine ID associated with each of the plurality of employees;

receive one or more identification inquiries from the virtual machine controller to identify a virtual machine ID based on a given employee ID; and transmit, in response to the one or more identification inquiries, the virtual machine ID associated with the one of the plurality of employees with the employee ID to the virtual machine controller.

23. The non-transitory computer storage medium of claim 19, wherein the one or more employee presence detection devices comprise:

a security control system of a predetermined area configured to detect the entering and exiting of the plurality of employees individually;

a proximity detection device configured to detect the entering and exiting a vicinity of the predetermined area for each of the plurality of employees individually;

a wireless device detection device configured to detect a presence at and a departure from the predetermined area for each of the plurality of employees individually;

an online virtual machine control system configured to detect logins and logouts of the plurality of employees individually; and an employee working schedule control system configured to control the launching and the shutting down of a virtual machine according to a working schedule of an employee of the plurality of employees associated with the virtual machine.

24. The non-transitory computer storage medium of claim 19, wherein the computer executable instructions are further configured to:

determine that the detected employee presence event of the one of the plurality of employees is the ingress event when:

the one of the plurality of employees enters the security control system of the predetermined area;

the presence event of the one of the plurality of employees is detected by the proximity detection device of the predetermined area;

the presence event is detected by the wireless device detection device of the predetermined area;

the one of the plurality of employees logs into a virtual machine remotely; or a current time reaches the one of the plurality of employees start of predetermined working schedule;

determine that the detected employee presence event of the one of the plurality of employees is the egress event when:

the one of the plurality of employees exits the security control system of the predetermined area;

the one of the plurality of employees departure is detected by the proximity detection device of the predetermined area;

the one of the plurality of employees departure is detected by the wireless device detection device of the predetermined area;

the one of the plurality of employees logs out of the virtual machine remotely; or the current time reaches the one of the plurality of employees end of predetermined working schedule; and transmit the detected employee presence event of the one of the plurality of employees to the attendance database.

25. The non-transitory computer storage medium of claim 19, wherein a shutting down delay T2 is applied to delay the shutting down of the virtual machine when the virtual machine control system instructs the hypervisor to shut down the virtual machine.

* * * * *